United States Patent
Wakabayashi et al.

(10) Patent No.: US 9,349,504 B2
(45) Date of Patent: May 24, 2016

(54) WATER STOPPING STRUCTURE FOR INSULATION-COATED WIRE AND WIRE HARNESS

(71) Applicant: SUMITOMO WIRING SYSTEMS, LTD., Mie (JP)

(72) Inventors: Masataka Wakabayashi, Mie (JP); Hiroyuki Ootsuki, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/740,770

(22) Filed: Jun. 16, 2015

(65) Prior Publication Data
US 2015/0371734 A1 Dec. 24, 2015

(30) Foreign Application Priority Data

Jun. 24, 2014 (JP) .................................. 2014-129327

(51) Int. Cl.
*H02G 3/06* (2006.01)
*H01B 7/282* (2006.01)
*H02G 3/04* (2006.01)

(52) U.S. Cl.
CPC ........... *H01B 7/2825* (2013.01); *H02G 3/0406* (2013.01); *H02G 3/0462* (2013.01)

(58) Field of Classification Search
USPC ............... 174/74 R, 77 R, 78, 79, 84 R, 88 R
See application file for complete search history.

(56) References Cited

U.S. PATENT DOCUMENTS

| | | | | |
|---|---|---|---|---|
| 3,507,977 A | * | 4/1970 | Pusey | H01R 4/00 174/110 PM |
| 3,539,708 A | * | 11/1970 | Alleva | H01R 4/2495 174/84 C |
| 3,768,941 A | * | 10/1973 | D'Ascoli | H01R 4/01 174/87 |
| 3,839,595 A | * | 10/1974 | Yonkers | H01R 4/2495 174/84 C |
| 4,065,637 A | * | 12/1977 | Allison | H01R 4/2495 174/84 C |
| 4,075,417 A | * | 2/1978 | Neale, Sr. | H01R 4/245 174/84 C |
| 4,118,596 A | * | 10/1978 | Bassett | H01R 43/00 174/84 C |
| 4,600,804 A | * | 7/1986 | Howard | H01R 4/20 174/84 C |
| 5,274,006 A | * | 12/1993 | Kagoshima | C08J 9/06 521/104 |
| 5,431,758 A | * | 7/1995 | Delalle | H02G 15/043 156/49 |
| 5,470,622 A | * | 11/1995 | Rinde | B29C 61/0616 156/84 |
| 5,821,460 A | * | 10/1998 | Marmy | H01R 4/22 174/74 A |

FOREIGN PATENT DOCUMENTS

| | | |
|---|---|---|
| JP | 2000-113917 | 4/2000 |
| JP | 2008-131327 | 6/2008 |

* cited by examiner

*Primary Examiner* — William H Mayo, III
(74) *Attorney, Agent, or Firm* — Greenblum & Bernstein, P.L.C.

(57) ABSTRACT

A water blocking structure for an insulation-coated wire includes a heat-shrinkable tubular protective member that is closed at one end by a stopper and that accommodates an intermediate portion of an insulation-coated wire, and a resin material that is accommodated in the tubular member and that penetrates the intermediate portion of the insulation-coated wire, the resin material serving as a water blocking agent. Slit portions are formed in a coating of the insulation-coated wire, and the resin material penetrates the intermediate portion via these slit portions. A coating stripping member with a blade whose cutting edges are directed to the inside of the respective slit portions is contained within the protective member.

8 Claims, 12 Drawing Sheets

WATER STOPPING STRUCTURE FOR INSULATION-COATED WIRE AND WIRE HARNESS

TECHNICAL FIELD

The present invention relates to a water blocking structure for an insulation-coated wire and a wire harness, and particularly relates to a water blocking structure for an insulation-coated wire that is effective when provided at an intermediate portion of the insulation-coated wire and a wire harness.

BACKGROUND ART

In wire harnesses that are installed in automobiles and the like, often, a coating of an insulation-coated wire is partially stripped to expose a conductor composed of a group of elemental wires, and another wire is connected to the exposed portion of the conductor by welding or by using a crimp terminal, or a connection terminal is crimped onto the exposed portion of the conductor. In cases where such an exposed portion of a conductor or an electrical connection portion is disposed in an area that may be exposed to water, reliable waterproofing is required.

Therefore, conventionally, a branch connection structure has been proposed in which a terminal splice portion for branching a branch line from a trunk line of a wire harness serving as a communication line for an on-board network is housed in a protective cap made of resin, and this protective cap is fixed to a portion near end portions of respective coatings of the trunk line and the branch line by winding tape therearound or by using a heat-shrinkable tube or a water blocking agent (see JP 2008-131327A, for example).

Also, a waterproofing device has been proposed in which a core wire (conductor) exposed portion that is uncoated is formed at an intermediate portion of a plurality of coated lead wires that are bent upward in an inverted U shape, and a waterproof and heat-resistant insulating tube that is bent in an inverted U shape is provided, the insulating tube covering the core wire exposed portion of the plurality of coated lead wires (see JP 2000-113917A, for example).

JP 2008-131327A and JP 2000-113917A are examples of related art.

However, the former conventional water blocking structure for an insulation-coated wire, in which the terminal splice portion is contained in the protective cap, cannot be used for waterproofing of an intermediate splice portion.

On the other hand, even though the latter conventional water blocking structure for an insulation-coated wire, in which a plurality of coated lead wires having the core wire exposed portion are bent in an inverted U shape, can be used for blocking water at the conductor exposed portion in the intermediate portion or waterproofing of the intermediate splice portion, there are unsolved problems as described below.

That is to say, in the latter conventional water blocking structure for an insulation-coated wire, the insulation-coated wire with the conductor exposed portion formed at an intermediated portion thereof is inserted into the insulating protective tube, and that insulation-coated wire is folded in an inverted U shape together with the insulating protective tube at a position different from the conductor exposed portion that is easy to bend. Therefore, the operation of bending that insulation-coated wire and the insulating protective tube is not easy and thus increases the manufacturing cost. In addition, the insulating protective tube after bending tends to be corrugated or bent in the vicinity of the conductor exposed portion, and an end portion of the coating of the insulation-coated wire that is adjacent to the conductor exposed portion tends to be opened. Therefore, the water blocking ability may be easily deteriorated.

Furthermore, for both the conventional water blocking structures for an insulation-coated wire, a coating stripping operation of stripping off the coating at a predetermined position and in a section of a predetermined length in advance is indispensable. Therefore, in a case where, for example, a high level of water blocking performance is desired by preventing especially the intermediate portion of the insulation-coated wire from suffering secondary exposure to water from the terminal portion, the problems such as deterioration in workability and an increase in manufacturing cost cannot be avoided.

SUMMARY OF THE INVENTION

The present invention was made in order to address problems such as those described above, and it is an object thereof to provide a low-cost water blocking structure for an insulation-coated wire that can ensure high water blocking ability and favorable workability at an intermediate portion of the insulation-coated wire and also provide a low-cost wire harness having high water blocking ability and favorable workability.

In order to accomplish the above-described object, a water blocking structure for an insulation-coated wire according to the present invention is a water blocking structure for an insulation-coated wire, the water blocking structure including a heat-shrinkable tubular member that is closed at one end by a closing member and that accommodates an intermediate portion of an insulation-coated wire, and a water blocking agent that is accommodated in the tubular member and that penetrates the intermediate portion of the insulation-coated wire, wherein a slit portion is formed in a coating of the insulation-coated wire, and the water blocking agent penetrates the intermediate portion via the slit portion, and a coating stripping member with a blade portion whose cutting edge is directed to the inside of the slit portion is contained within the tubular member, and the closing member and the coating stripping member are integrally connected to each other.

With this configuration, the present invention eliminates the necessity to perform a coating stripping operation for exposing a conductor within a certain longitudinal region of the intermediate portion of the insulation-coated wire in a longitudinal direction in advance, and thus a low-cost water blocking structure for an insulation-coated wire that can ensure high water blocking ability and favorable workability is obtained. Furthermore, since the closing member and the coating stripping member are integrally connected to each other, the position at which the blade portion cuts into the coating inside the tubular member can be precisely regulated, and thus a stable water blocking structure can be realized.

In the water blocking structure for an insulation-coated wire of the present invention, it is also possible that the slit portion is formed in the coating of the insulation-coated wire so as to extend in a direction that crosses an axis of the insulation-coated wire, and the blade portion has a first and second cutting edge portion that are arranged on opposite sides of the intermediate portion with respect to a radial direction so that respective cutting edges of the first and second cutting edge portions oppose each other.

With this configuration, slits that are located on opposite sides of the coating with respect to the radial direction can be easily and reliably made by moving the coating of the insulation-coated wire in the radial direction so that the coating is inserted between the first and second cutting edge portions, and therefore good workability is provided.

In the water blocking structure for an insulation-coated wire of the present invention, it is preferable that the coating stripping member has the blade portion having the first and second cutting edge portions, a joint portion that integrally joins the first and second cutting edge portions of the blade portion to each other, and a positioning portion that joins the joint portion to the closing member and positions the first and second cutting edge portions with respect to the closing member.

With this configuration, the joint portion secures a fixed distance between the first and second cutting edge portions, and the axial positions of both of the cutting edge portions with respect to the closing member, that is, the positions at which the respective slit portions are formed are stably secured.

In the water blocking structure for an insulation-coated wire of the present invention, it is also possible that the closing member and the coating stripping member are connected to each other such that relative positions thereof can be adjusted in an axial direction of the insulation-coated wire, and the relative positions are fixed by the water blocking agent.

With this configuration, irrespective of the form of the intermediate portion of the insulation-coated wire, the blade portion of the coating stripping member can be disposed in positions that are suitable for cutting into the coating, and therefore a more stable, favorable water blocking structure can be realized.

A wire harness according to the present invention includes the water blocking structure for an insulation-coated wire that is configured as described above. With this configuration, a low-cost wire harness having high water blocking ability and favorable workability is obtained.

According to the present invention, it is possible to provide a low-cost water blocking structure for an insulation-coated wire that can ensure high water blocking ability and favorable workability at an intermediate portion of the insulation-coated wire and also provide a low-cost wire harness having high water blocking ability and favorable workability.

BRIEF DESCRIPTION OF THE DRAWINGS

FIG. 2A is a cross-sectional view, FIG. 2B is a view in the direction of arrow IIB in FIG. 2A, and FIG. 2C is a view in the direction of arrow IIC in FIG. 2A.

FIG. 11A is a plan view of the coating stripping member when opened and FIG. 11B is a side view of the coating stripping member when opened.

EMBODIMENTS OF THE INVENTION

Hereinafter, embodiments for carrying out the present invention will be described.

First Embodiment

FIGS. 1 to 6 show a first embodiment of a wire harness including a water blocking structure for an insulation-coated wire according to the present invention. In the present embodiment, the present invention is applied to a wire harness for a vehicle, the wire harness having a water blocking structure at an intermediate portion of a single insulation-coated wire. Naturally, the present invention is also applicable to a case where a water blocking structure is provided at an intermediate portion of a plurality of insulation-coated wires.

The configuration of the present embodiment will be described first.

Figure 1:
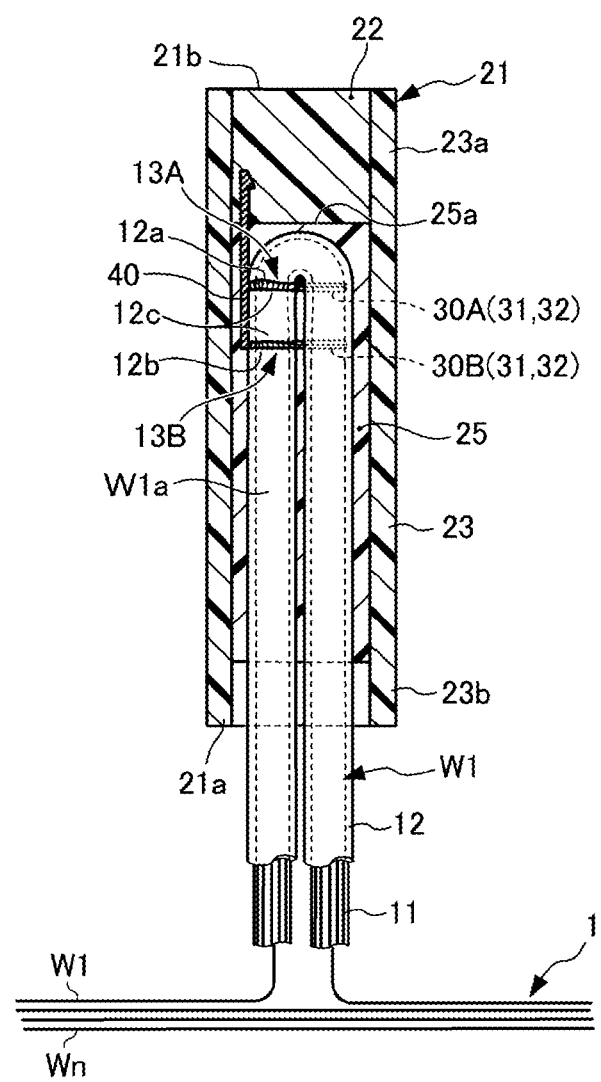
FIG. 1 is a cross-sectional view of a relevant portion of a wire harness including a water blocking structure for an insulation-coated wire according to a first embodiment of the present invention.

As shown in FIG. 1, the water blocking structure for an insulation-coated wire according to the present embodiment is provided on an insulation-coated wire W1 of a wire harness 1 having a plurality of insulation-coated wires W1 to Wn (n is a natural number of 2 or more) serving as a group of wires in a bundle.

Figure 6:
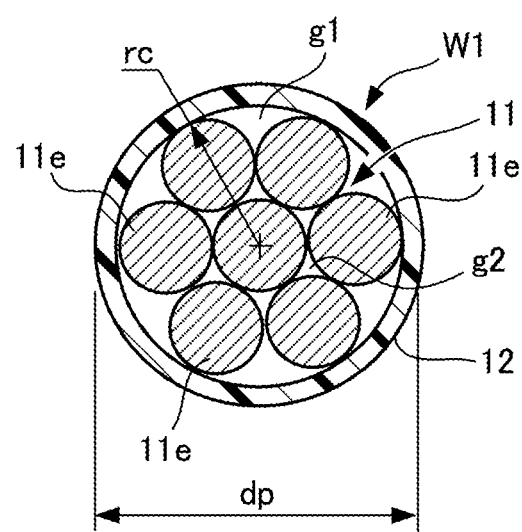
FIG. 6 is a horizontal cross-sectional view of the insulation-coated wire in a portion of the wire harness including the water blocking structure for an insulation-coated wire according to the first embodiment of the present invention.

As shown in FIGS. 1 and 6, for example, the insulation-coated wire W1 is constituted by a conductor 11 consisting of a plurality of elemental wires 11e that are bundled together and a coating 12 that concentrically surrounds the conductor 11.

The conductor 11 is configured by, for example, a circular stranded wire obtained by twisting together the plurality of elemental wires 11e, which are soft conducting wires, but is not necessarily required to be a stranded wire. The coating 12 is configured by, for example, a tube of an insulating material having a circular cross section, the tube being made of resin containing vinyl chloride resin as a main component.

An intermediate portion W1a (portion away from both end portions) of the insulation-coated wire W1 in a longitudinal direction is bent in a folded-backward direction as shown in FIG. 1 and thus has a substantially U shape. Moreover, a plurality of linear slit portions 13A and 13B are formed by cutting instruments in the coating 12 within and near a region where this intermediate portion W1a is bent or within a predetermined axial distance from the bent region of the intermediate portion W1a, the slit portions extending in a direction that crosses the axis of the insulation-coated wire W1. These slit portions 13A and 13B are formed by linearly cutting open an intermediate portion of the coating 12 at predetermined positions with the cutting instruments and each allow a portion of the conductor 11 to be exposed to the outside of the coating 12.

Figure 4A:
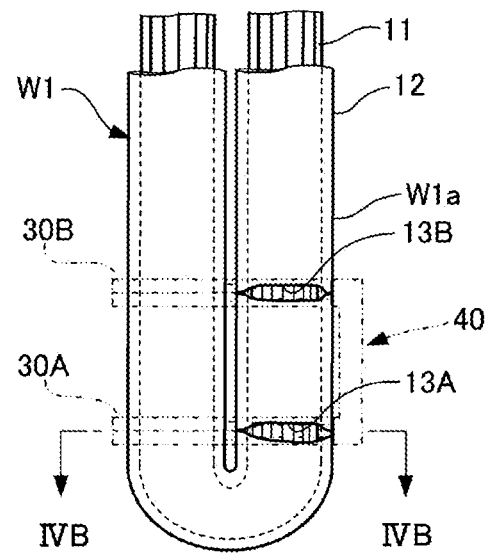
FIG. 4A is an explanatory diagram of slit portions in the insulation-coated wire of the water blocking structure for an insulation-coated wire according to the first embodiment of the present invention.

As shown in FIGS. 1 and 4A, for example, one of the slit portions 13A is formed within or near the bent region of the intermediate portion W1a of the insulation-coated wire W1 so as to be located on opposite sides of the conductor 11 with respect to a radial direction (a particular radial direction perpendicular to the paper plane in FIG. 1) that is parallel to the central axis of the bend of the intermediate portion W1a, and extends in the outer circumferential direction in a horizontal cross section of the coating 12 on the opposite sides with respect to that radial direction. This slit portion 13A may be constituted by a pair of openings each having a shape that opens wide in a central portion with respect to the extending direction or a single opening having a shape that opens wide on the outside of the bend of the intermediate portion W1a.

The other slit portion 13B is formed within a predetermined axial range that is further away from the bent region of the intermediate portion W1a of the insulation-coated wire W1 than the slit portion 13A so as to be located on opposite sides of the conductor 11 with respect to the radial direction of the intermediate portion W1a. On each side, the slit portion 13B extends in the outer circumferential direction in a horizontal cross section of the coating 12 and, substantially similarly to the slit portion 13A, has an opening shape that is widest in a central portion with respect to the extending direction or on the outside of the bend.

The cutting directions of these slit portions 13A and 13B may be slanted with respect to the direction shown in the drawing that is perpendicular to the axis of the insulation-coated wire W1 and the central axis of the bend. That is to say, any number of slit portions may be disposed in any position and orientation.

In the intermediate portion W1a of the insulation-coated wire W1, for example, the plurality of elemental wires 11e of the conductor 11 are individually bent in the folded-backward direction and form a substantially U shape. Moreover, the intermediate portion W1a of this insulation-coated wire W1 is accommodated within a heat-shrinkable protective member 21 (tubular member) that has a substantially bottomed cylindrical shape and is closed at one end. The protective member 21 is used to provide insulation, heat resistance, and mechanical protection.

A resin material 25 functioning as a water blocking agent is provided inside the protective member 21, and the resin material 25 is cured in a substantially bottomed cylindrical shape in a state in which the slit portions 13A and 13B as well as intermediate end portions 12a, 12b, and 12c of the coating 12 that are adjacent to both the slit portions 13A and 13B are coated with the resin material 25.

This resin material 25 penetrates the inside of the coating 12 of the intermediate portion W1a via the slit portions 13A and 13B while being accommodated inside the protective member 21 so as to surround the intermediate portion W1a of the insulation-coated wire W1. Moreover, the resin material 25 has an outer diameter that is larger than the sum of the diameters of a pair of parallel portions of the coating 12 that are continuous with the folded-back intermediate portion W1a of the insulation-coated wire W1, and also is longer than the formation range of the slit portions 13A and 13B in the axial direction of the protective member 21.

Both of the outer diameter and the axial length of the protective member 21 are larger than those of the resin material 25. This protective member 21 has a stopper 22 (closing member) that closes one end of the protective member 21 while being spaced apart from the slit portions 13A and 13B by a predetermined separation distance in the axial direction, and a heat-shrinkable tube 23 that is shrunken to a predetermined shrunken diameter and whose inner circumference on the side of one end portion 23a is in close contact with the stopper 22.

The stopper 22 has a circular horizontal cross section, for example; however, stoppers having an elliptical or other non-circular horizontal cross sections may also be used. Moreover, an annular rib, a flange, an annular groove, or the like may be formed at an outer circumferential portion of the stopper 22, and the stopper 22 may have a truncated cone-shaped vertical cross section.

The heat-shrinkable tube 23 surrounds intermediate end portions 12a, 12b, and 12c of the coating 12 that are in close proximity to the slit portions 13A and 13B on opposite sides thereof as well as the slit portions 13A and 13B. The heat-shrinkable tube 23 is made of a tube that can shrink in a radial direction when heated, and is obtained by cutting out a tube from a longer tube and shrinking the tube to a predetermined shrunken diameter. This heat-shrinkable tube 23 is a known tube whose shrunken inner diameter after heat shrinkage is generally about ½ of the inner diameter before heat shrinkage.

The stopper 22 has an outer diameter that is larger than a shrunken diameter of the heat-shrinkable tube 23 at the limit of shrinkage and is in close contact with the inner circumference of the end portion 23a of the heat-shrinkable tube 23 in a pressure contact state. It should be noted that the shrunken diameter of the heat-shrinkable tube 23 as used herein refers to a dimension of an inner circumferential surface of the end portion 23a of the heat-shrinkable tube 23 that is geometrically similar to an outer circumferential surface of the stopper 22, with respect to a corresponding radial direction.

The stopper 22 is composed of, for example, a hard resin or a lightweight metal. In the case where the stopper 22 is formed of a resin, a polyolefin resin such as, for example, polypropylene (PP) or polyethylene (PE) can be used. Moreover, forming the heat-shrinkable tube 23 of a polyolefin resin, such as, for example, polypropylene (PP) or polyethylene (PE), can cause the heat-shrinkable tube 23 to develop a heat sealing property on the outer circumferential surface of the stopper 22 when shrinking and coming into close contact with the outer circumference of the stopper 22 in a liquid-tight manner.

The resin material 25 is formed of a thermosetting resin that is cured while being brought into close contact with the protective member 21 and the insulation-coated wire W1, for example, a cured layer obtained by thermally curing a two-component thermosetting epoxy resin having low viscosity. The low viscosity means such a degree of viscosity that the two-component thermosetting epoxy resin having fluidity before thermal curing exhibits a high degree of adhesion to the circumference of the conductor 11 exposed in the slit portions 13A and 13B and also easily penetrates gaps g1 and g2 (see FIG. 6) among the elemental wires 11e in the vicinity of the slit portions 13A and 13B.

Thus, the resin material 25 is cured while forming one end surface 25a that is in close contact with the stopper 22 between the protective member 21 and the insulation-coated wire W1 and penetrating the inside of the coating 12 from the slit portions 13A and 13B and also the gap g2 that is formed among the elemental wires 11e on the inside of the slit portions 13A and 13B.

On the other hand, within the protective member 21, the coating stripping member 40 having a plurality of cutting blade portions 30A and 30B (opposing blade portions) individually constituted by sharp opposing blades 31 and 32 that are capable of cutting open the coating 12 as well as a joint portion 33 that integrally joins the cutting blade portions 30A and 30B to each other is contained.

The coating stripping member 40 is adapted to form the slit portions 13A and 13B in the coating 12 of the insulation-coated wire W1 with the cutting blade portions 30A and 30B, and thus be able to provide the function of exposing a portion of the conductor 11 in the coating 12 to the outside of the coating 12 without stripping the coating 12 from the conductor 11, that is to say, the function equivalent to stripping the coating.

As shown in FIG. 3, a keyhole-shaped recess 34 is formed in each of the cutting blade portions 30A and 30B. The opposing blades 31 and 32 are arranged in a substantially V shape on the entrance side of the recess 34, and a recessed, wire holding portion 35 that has a predetermined radius and in which the cutting edge is flattened is disposed on the inner side of the recess 34.

Figure 2A:
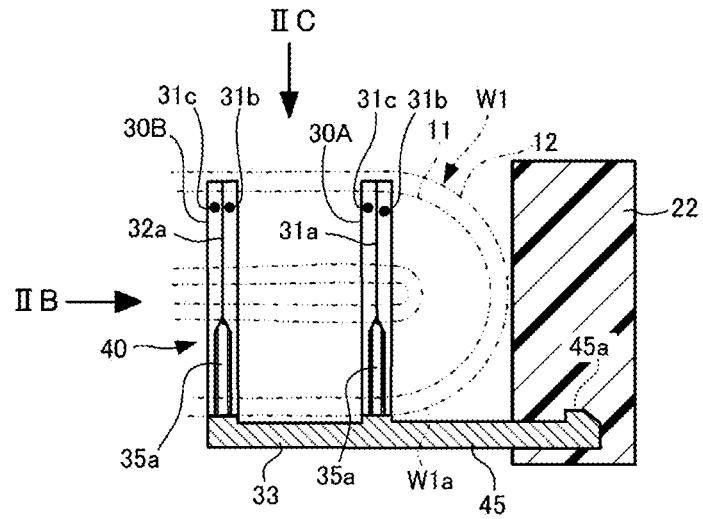
FIGS. 2A to 2C show a coating stripping member of the water blocking structure for an insulation-coated wire according to the first embodiment of the present invention.
Figure 2B:
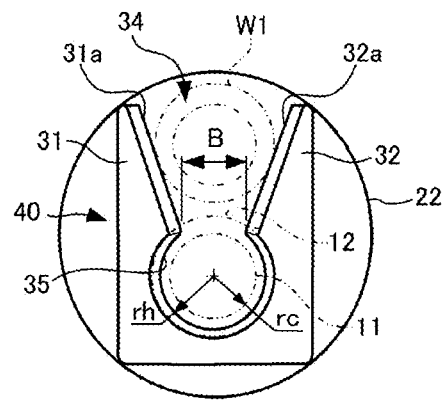
Figure 4B:
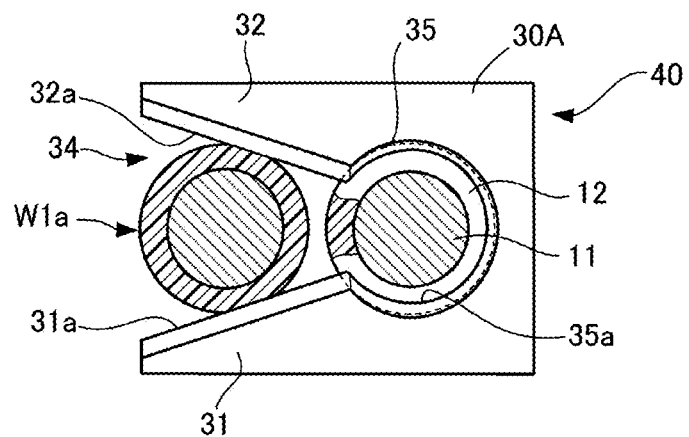
FIG. 4B is a cross-sectional view in the direction of arrows IVB-IVB in FIG. 4A.

As shown in FIGS. 2B and 4B, the wire holding portions 35 are located further inward of the respective recesses 34 than the opposing blades 31 and 32 of the cutting blade portions 30A and 30B, and hold the conductor 11 of the insulation-coated wire W1 in a state in which the wire holding portions 35 are inserted into the respective slit portions 13A and 13B of the coating 12.

Figure 2C:
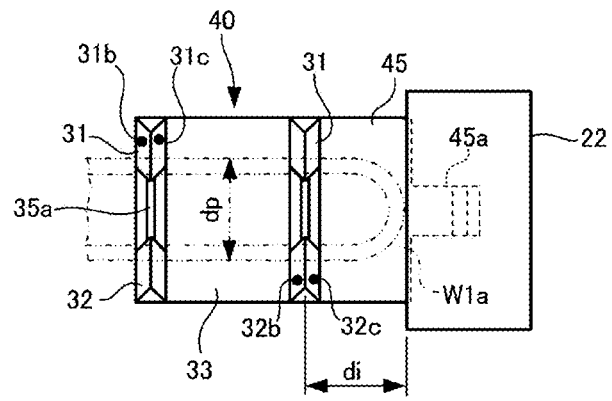

Specifically, as shown in FIGS. 2A to 2C, each wire holding portion 35 has a horseshoe-shaped inner circumferential wall surface 35a that extends halfway or more around the conductor 11 of the insulation-coated wire W1, and the radius rh of this inner circumferential wall surface 35a is set to be smaller than the radius (dp/2) of the coating 12 of the insulation-coated wire W1 and larger than or equal to the radius rc of the conductor 11 (rc≤rh<dp/2).

It is also possible that the radius of the wire holding portions 35 is reduced on the central side of the respective slit portions 13A and 13B and increased on the corner side of the respective slit portions 13A and 13B. Moreover, it is also possible that the wire holding portions 35 have a substantially U-shaped recessed shape. The width of each inner circumferential wall surface 35a is substantially fixed and may be, for example, 1 mm or less.

Moreover, as shown in FIG. 2A, the inner circumferential wall surface 35a of each wire holding portion 35 is adjacent to the cutting edge portion 31a (cutting edge line) and the two blade surfaces 31b and 31c of the opposing blade 31 on one end side, and is similarly adjacent to the cutting edge portion 32a (cutting edge line) and the two blade surfaces 32b and 32c of the opposing blade 32 on the other end side.

Furthermore, a minimum cutting edge distance B (see FIG. 2B) with which the cutting edge portions 31a and 32a of the respective opposing blades 31 and 32 are the closest to each other is substantially equal to the entrance width, which is the distance between the two ends of the inner circumferential wall surface 35a of the wire holding portion 35 that are respectively connected to the cutting edge portions 31a and 32a.

This minimum cutting edge distance B is set at a value that is slightly smaller than the diameter (2rc) of the conductor 11 of the insulation-coated wire W1, for example, 80% to 90% of the diameter of the conductor 11 so that when the insulation-coated wire W1 passes through the portion of the minimum cutting edge distance B between the opposing blades 31 and 32, the coating 12 can be reliably cut open by the opposing blades 31 and 32.

The two end portions of the inner circumferential wall surface 35a that are continuous with the respective inner end portions of the opposing blades 31 and 32 at the minimum cutting edge distance B from each other may each be an obtuse cutting edge surface or may be the same curved surface as that of the central portion.

Figure 3A:
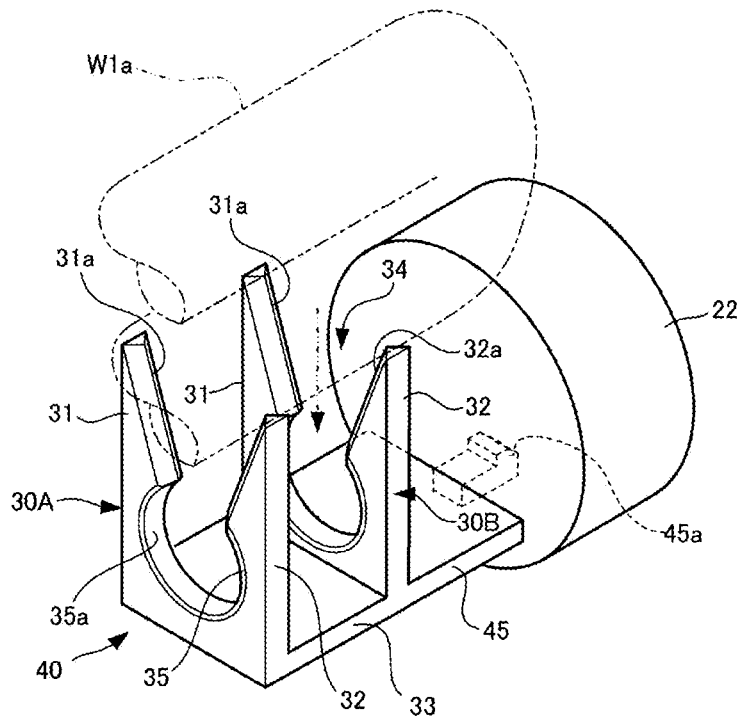
FIG. 3A is a perspective view showing a direction in which the coating stripping member of the water blocking structure for an insulation-coated wire according to the first embodiment of the present invention cuts into the insulation-coated wire.
Figure 3B:
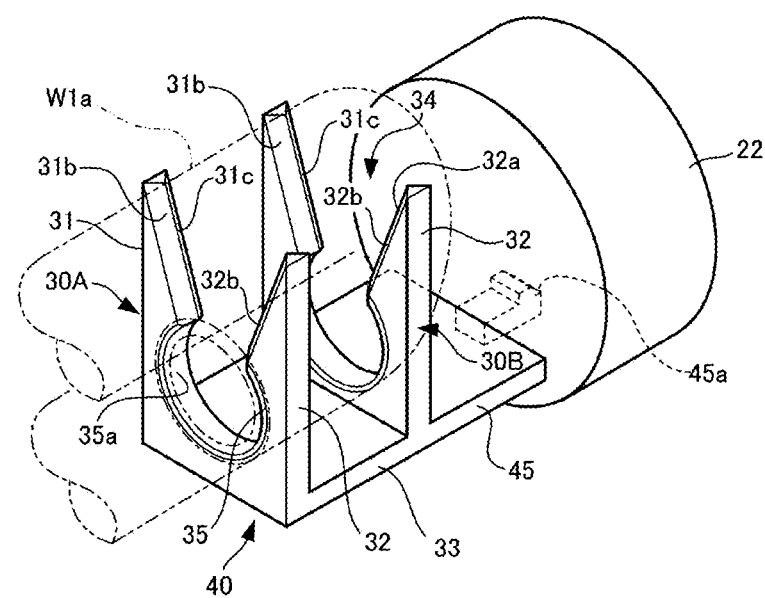
FIG. 3B is a perspective view showing an installation position of the coating stripping member in a state in which the coating stripping member cuts into the insulation-coated wire.

With the coating stripping member 40 as described above, it is possible that when a portion of the insulation-coated wire W1 is pushed into the recesses 34 as shown in FIG. 3A, the opposing blades 31 and 32 are caused to cut into the coating 12, and when the portion of the insulation-coated wire W1 is pushed to the inner side of the recesses 34 as shown in FIG. 3B, the conductor 11 exposed in the slit portions 13A and 13B is held and contained in the wire holding portions 35 while the slit portions 13A and 13B of the coating 12 that are made by the opposing blades 31 and 32 are held in the cut-open state by the wire holding portions 35.

FIG. 4A illustrates exemplary opening shapes of the slit portions 13A and 13B in the coating 12 when held in the cut-open state by the wire holding portions 35 in the above-described manner, and FIG. 4B illustrates a horizontal cross section of the intermediate portion W1a of the insulation-coated wire W1 at the center of the slit portion 13A in conjunction with the cutting blade portion 30A.

At least the opposing blades 31 and 32 of the coating stripping member 40 are each made of a material having a sufficiently greater thermal conductivity than both the resin material 25 and the coating 12, for example, a metal whose thermal conductivity is ten or more times greater than those of both the resin material 25 and the coating 12. Naturally, the entire coating stripping member 40 may also be formed of such a material having a high thermal conductivity.

On the other hand, in addition to the cutting blade portions 30A and 30B and the joint portion 33, the coating stripping member 40 has a connection portion 45 (positioning portion) that integrally connects the cutting blade portions 30A and 30B to the stopper 22 via the joint portion 33, and the stopper 22 and the coating stripping member 40 are integrally connected to each other.

That is to say, the coating stripping member 40 includes the cutting blade portions 30A and 30B each having the opposing blades 31 and 32 with their respective cutting edge portions 31a and 32a opposing each other, and the connection portion 45, separately from the plate-shaped joint portion 33 that integrally joins the opposing blades 31 and 32 of the cutting blade portions 30A and 30B to one another. This connection portion 45 is adapted to integrally join the joint portion 33 to the stopper 22 and function as a positioning portion that positions the cutting edge portions 31a and 32a of the opposing blades 31 and 32 of the cutting blade portions 30A and 30B at predetermined positions with respect to the stopper 22 in the axial direction.

Specifically, the connection portion 45 of the coating stripping member 40 is a plate-shaped portion that extends continuously from the plate-shaped joint portion 33 to the side of the stopper 22, the joint portion 33 joining the plate-shaped cutting blade portions 30A and 30B to each other on their base end sides, and as shown in FIGS. 2A and 2C, this plate-shaped connection portion 45 has a leading end embedded portion 45a that is formed in a hook shape and embedded in the stopper 22. It is sufficient if this leading end embedded portion 45a is shaped so as to be prevented from disengaging from the stopper 22, and may also have any shape that prevents disengagement other than a hook shape.

In the present embodiment, the connection portion 45 of the coating stripping member 40 is embedded in the stopper 22 during resin molding of the stopper 22, and thus the stopper 22 and the coating stripping member 40 are restricted by each other and positioned in at least a direction of the axis of the insulation-coated wire W1. This positioning is performed such that, for example, the cutting edge portions 31a and 32a of the opposing blades 31 and 32 of the cutting blade portion 30A are spaced apart from the upper surface of the stopper 22 by a predetermined separation distance di (see FIG. 2C) in the axial direction.

Next, an example of a method for manufacturing the wire harness 1 of the present embodiment will be described.

Figure 5:
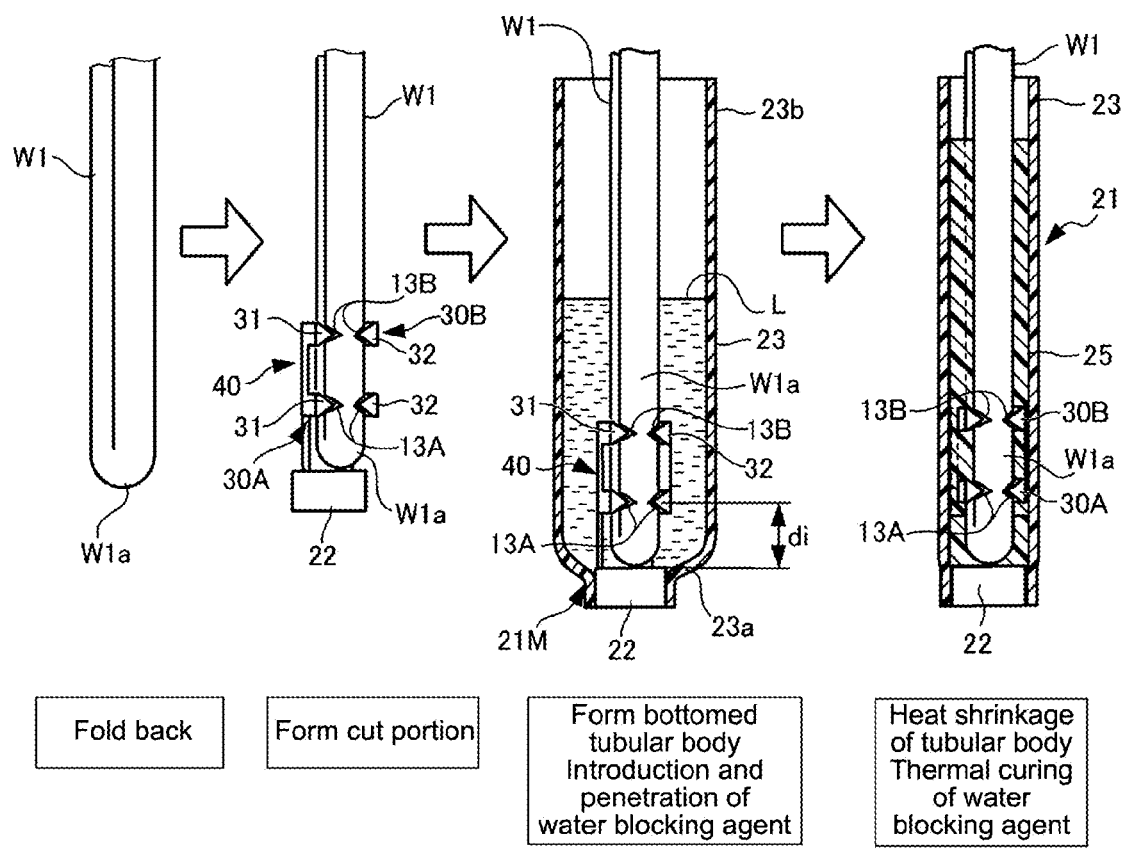
FIG. 5 is an explanatory diagram of a manufacturing process of the wire harness including the water blocking structure for an insulation-coated wire according to the first embodiment of the present invention.

First, as shown in a folding back step in FIG. 5, the intermediate portion W1a of the insulation-coated wire W1 is bent in a folded-backward direction in a substantially U shape.

Then, as shown in FIG. 3 and in a cut portion forming step in FIG. 5, the coating stripping member 40 is engaged with the substantially U-shaped intermediate portion W1a of the insulation-coated wire W1 from one side and is thus caused to provide the coating stripping function.

That is to say, the coating stripping member 40 cuts open the coating 12 in the bent region of the insulation-coated wire W1 with the opposing blades 31 and 32 without stripping the coating 12 from the conductor 11, and thus the slit portions 13A and 13B that expose a portion of the conductor 11 inside the coating 12 to the outside of the coating 12 are formed on opposite sides with respect to a particular radial direction, which is the direction of the central axis of the bend of the intermediate portion W1a.

During formation of this slit portions 13A and 13B, in a state in which a tensile stress is produced in the coating 12 in the bent region of the insulation-coated wire W1 such that the tensile stress increases toward the outside of the bend, the opposing blades 31 and 32 cut into the coating 12 in the vicinity of and within a predetermined distance range from that region. Thus, the slit portions 13A and 13B that open wide at their center with respect to the slit's longitudinal direction are formed in the intermediate portion W1a of the insulation-coated wire W1 (see FIG. 42). Moreover, a state in which the opposing blades 31 and 32 are located at a depth position where the opposing blades 31 and 32 are cutting into the coating 12, and also a portion of the conductor 11 is exposed to the outside of the coating 12 is achieved.

Then, as shown in a bottomed tubular body forming step in FIG. 5, the intermediate portion W1a of the insulation-coated wire W1 and the coating stripping member 40 are inserted into the heat-shrinkable tube 23 before heat shrinkage so that the circumference of the stopper 22 that is integral with the coating stripping member 40 is surrounded by the end portion 23a of the heat-shrinkable tube 23.

Then, the end portion 23a of the heat-shrinkable tube 23 is heated by hot air or the like to form a bottomed tubular body 21M for the protective member 21 in which the end portion 23a of the heat-shrinkable tube 23 is brought into close contact with the outer circumference of the stopper 22. At this time, the height of the cylindrical surface where the end portion 23a of the heat-shrinkable tube 23 and the stopper 22 are in close contact with each other is regulated such that a bottom surface (inner bottom surface) of the bottomed tubular body 21M on the inner side is separated from the position at which the slit portion 13A is formed by a predetermined separation distance di in the axial direction.

Then, as shown in a water blocking agent introduction and penetration step in FIG. 5, the heat-shrinkable tube 23 whose end portion 23a is closed by the stopper 22 is oriented in the vertical direction with the closed end being located on the lower side, and a predetermined amount of two-component thermosetting epoxy resin solution L (water blocking agent), which is the material for the resin material 25, is introduced into the bottomed tubular body 21M from the vertically upper side of the heat-shrinkable tube 23 where the other end portion 23b is open. The amount of the solution to be introduced is set such that the intermediate portion W1a of the insulation-coated wire W1, especially within a certain distance from the slit portions 13A and 13B, is immersed in the thermosetting epoxy resin solution L.

At this time, since the slit portions 13A and 13B are formed in the intermediate portion W1a of the insulation-coated wire W1, and a portion of the conductor 11 is exposed in the slit portions 13A and 13B, the thermosetting epoxy resin solution L having low viscosity and high penetrability enters the inside of the coating 12 from the slit portions 13A and 13B of the insulation-coated wire W1 and even into, for example, gaps among the plurality of elemental wires 11e of the conductor 11. Then, due to a combined effect of capillary phenomenon, negative pressure produced within the coating 12, and the like, a state in which the thermosetting epoxy resin solution L has reliably penetrated through a water blocking region within a predetermined distance from the slit portions 13A and 13B is achieved.

Then, as shown in a tubular body heat shrinkage and water blocking agent thermal curing step in FIG. 5, the bottomed tubular body 21M in a state in which the insulation-coated wire W1 is inserted to a predetermined insertion depth and the slit portions 13A and 13B are immersed in the water blocking agent is entirely heated from the outside to shrink the heat-shrinkable tube 23 of the bottomed tubular body 21M and thermally cure the thermosetting epoxy resin solution L in the heat-shrinkable tube 23.

At this time, the heat-shrinkable tube 23 of the bottomed tubular body 21M undergoes heat shrinkage so that the diameter thereof is significantly reduced overall, and thus the heat-shrinkable tube 23 is formed, and the surface level of the thermosetting epoxy resin solution L increases. Then, when the heat-shrinkable tube 23 entirely shrinks to such an extent that the diameter thereof approaches a predetermined shrunken diameter, the thermosetting epoxy resin solution L has started to thermally cure, and finally, when the heat-shrinkable tube 23 entirely shrinks to almost the predetermined shrunken diameter that is close to the limit of shrinkage, the resin material 25 composed of a cured layer of the thermosetting epoxy resin is formed.

Next, the effects of the present embodiment will be described.

In the present embodiment that is configured as described above, the slit portions 13A and 13B from which the water blocking agent is allowed to penetrate to the inside of the coating 12 is formed in the vicinity of or within a certain distance range from the bent region where the intermediate portion W1a of the insulation-coated wire W1 is bent in the folded-backward direction. Accordingly, the necessity to perform the coating stripping operation (intermediate sheath stripping operation) for exposing the conductor within a specific longitudinal region of the intermediate portion W1a of the insulation-coated wire W1 in the longitudinal direction in advance is eliminated.

Specifically, in a state in which a stress due to bending is produced in the intermediate portion W1a of the insulation-coated wire W1 in the vicinity of the bent region, when slits having a predetermined depth are made in the coating 12 by the opposing blades 31 and 32, which are cutting instruments, the openings of the slits are widened due to the effect of the stress, and thus the slit portions 13A and 13B that expose a portion of the conductor 11 to the outside of the coating 12 are formed.

Accordingly, before heat shrinkage of the heat-shrinkable tube 23 of the protective member 21, the two-component thermosetting epoxy resin solution L, which is the water blocking agent, penetrates the inside of the coating 12 of insulation-coated wire W1 and even, for example, gaps among the elemental wires of the conductor 11 via the slit portions 13A and 13B. Moreover, when the heat shrinkage of the heat-shrinkable tube 23 of the protective member 21 and the thermal curing of the two-component thermosetting epoxy resin solution L start from the outer side, the inner pressure of the thermosetting epoxy resin solution L inside the bottomed tubular body 21M tends to increase. Furthermore, since the slit portions 13A and 13B are reliably held in the cut-open state by the wire holding portions 35 of the cutting blade portions 30A and 30B, the penetrability of the water blocking agent to the inside of the coating 12 increases. Thus, the two-component thermosetting epoxy resin solution L, which is the water blocking agent, reliably penetrates the inside of the coating 12 of the insulation-coated wire W1 and even, for example, gaps among the elemental wires 11e of the conductor 11 via the slit portions 13A and 13B.

When the heat-shrinkable tube 23 has been thermally shrunken to the predetermined shrunken diameter, and also the thermal curing of the thermosetting epoxy resin solution L has been finished, the water blocking structure for the insulation-coated wire is completed.

The wire harness 1 of the present embodiment, which has this water blocking structure for an insulation-coated wire, eliminates the necessity for the intermediate sheath stripping operation and can ensure favorable workability, so that the manufacturing cost can be reduced, and furthermore, high water blocking ability can be obtained by the resin material 25 reliably penetrating the inside of the coating 12.

Moreover, in the present embodiment, since the stopper 22 and the coating stripping member 40 are integrally connected to each other, the positions at which the cutting blade portions 30A and 30B cut into the coating 12 inside the tubular protective member 21 can be precisely regulated, and thus a stable water blocking structure can be realized.

Furthermore, in the present embodiment, the slit portions 13A and 13B that are located on opposite sides of the coating 12 with respect to the radial direction and cross the axis of the coating 12 can be easily and reliably made by moving the coating 12 of the insulation-coated wire W1 in the radial direction so that the coating 12 is inserted between the cutting edge portions 31a and 32a of the opposing blades 31 and 32, and therefore good workability is provided.

In addition, in the present embodiment, the coating stripping member 40 not only has the cutting blade portions 30A and 30B each having the cutting edge portions 31a and 32a, and the joint portion 33 that integrally joins the cutting edge portions 31a and 32a of the cutting blade portions 30A and 30B to one another, but also has the connection portion 45 that joins the joint portion 33 to the stopper 22 and thereby positions the cutting edge portions 31a and 32a of the opposing blades 31 and 32 with respect to the stopper 22. Accordingly, a fixed distance is secured between the cutting edge portions 31a and 32a by the joint portion 33, and the positions of both of the cutting edge portions 31a and 32a with respect to the stopper 22, that is, the positions at which the slit portions 13A and 13B are formed are stably secured.

In addition, since the opposing blades 31 and 32 according to the present embodiment have a sufficiently greater thermal conductivity than both the water blocking agent (thermosetting epoxy resin solution L) and the coating 12, during the application of heat for thermally shrinking the heat-shrinkable tube 23, the opposing blades 31 and 32 can cut into and open the coating 12 with a sufficiently increased efficiently.

Furthermore, according to the present embodiment, an inner diameter of the heat-shrinkable tube 23 that is suitable for the operation of inserting the wire into the heat-shrinkable tube 23 of the protective member 21 can be set easily, and before thermal curing of the thermosetting epoxy resin solution L, which is the water blocking agent, the water blocking agent can be easily introduced into the heat-shrinkable tube 23 of the protective member 21 together with a portion of the insulation-coated wire W1. Moreover, the low-viscosity, two-component thermosetting epoxy resin solution L that exhibits a high degree of adhesion to the conductor 11 and also easily penetrates the gaps g1 and g2 and the like in the coating 12 can be used. Accordingly, a stable cured layer that has high water blocking ability and high resistance to heat and that has reliably penetrated the circumference of the conductor 11, the gaps among the elemental wires, and the like within the coating 12 can be formed as the resin material 25.

As described above, according to the present embodiment, it is possible to provide a low-cost water blocking structure for an insulation-coated wire that can ensure high water blocking ability and favorable workability at the intermediate portion W1a of the insulation-coated wire W1, and it is possible to provide the low-cost wire harness 1 that employs the above water blocking structure and has high water blocking ability and favorable workability.

Second Embodiment

Figure 7A:
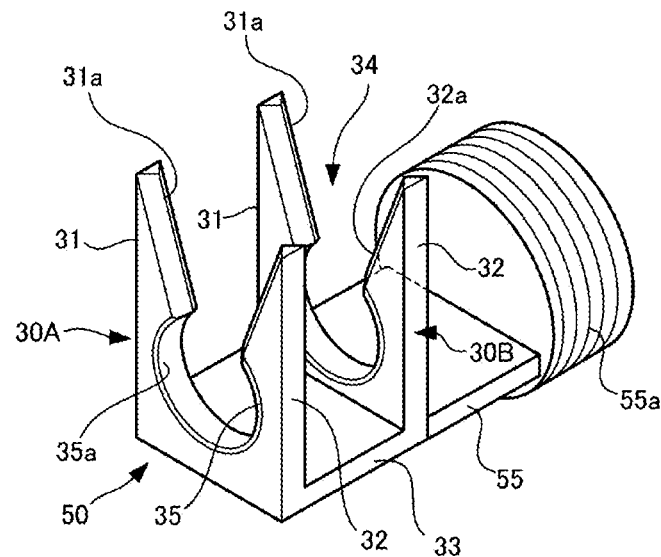
FIG. 7A is a perspective view of a coating stripping member of a water blocking structure for an insulation-coated wire according to a second embodiment of the present invention.
Figure 7B:
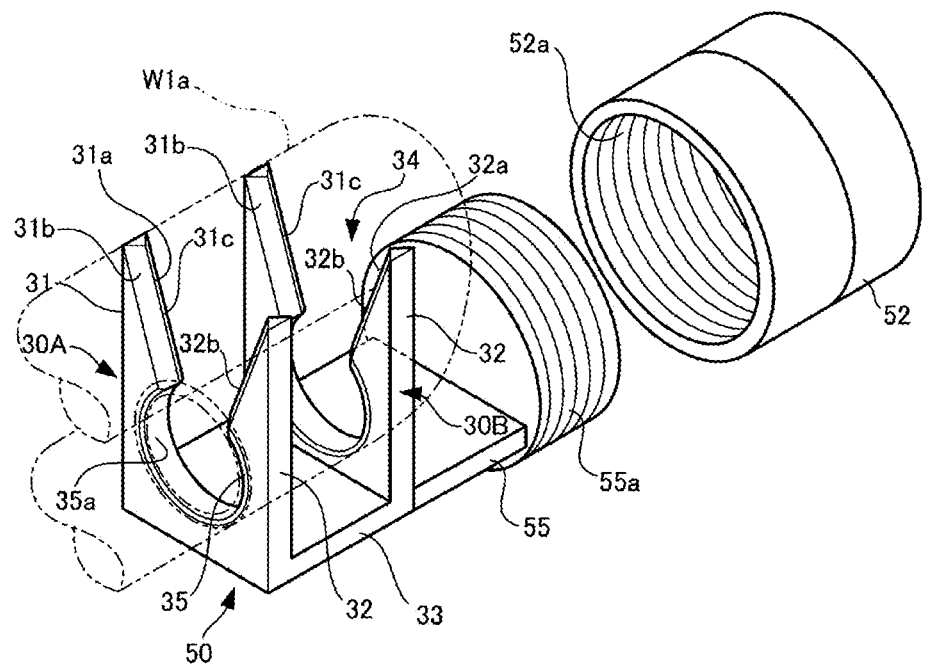
FIG. 7B is a perspective view of the coating stripping member and a closing member, showing a connection portion therebetween.
Figure 8:
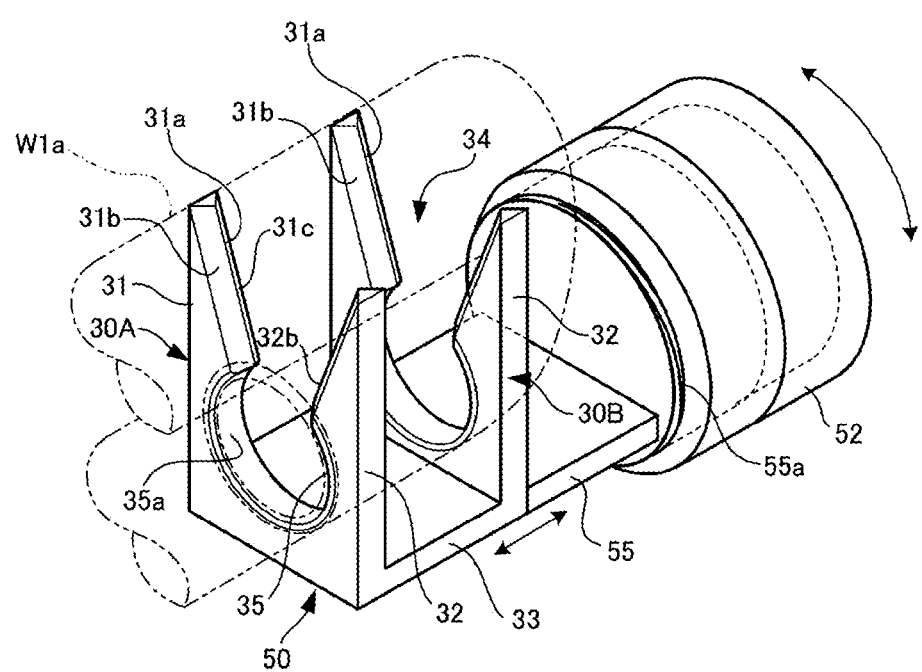
FIG. 8 is a perspective view showing a state in which the coating stripping member and the closing member of the water blocking structure for an insulation-coated wire according to the second embodiment of the present invention are connected to each other.

FIGS. 7A, 7B, and 8 show a coating stripping member of a water blocking structure for an insulation-coated wire according to a second embodiment of the present invention.

Although the leading end of the positioning portion 45 of the coating stripping member 40 is embedded in the stopper 22, and thus the coating stripping member 40 and the stopper 22 are integrally fixed to each other in the above-described first embodiment, it is also possible that a coating stripping member and a stopper are joined to each other such that their relative positions can be adjusted in the axial direction.

The second embodiment includes a coating stripping member and a stopper to which such a positional adjustment function is added. It should be noted that since embodiments that are described below are similar to the above-described first embodiment, constituent portions that are the same as or similar to those of the first embodiment are denoted by the reference numerals of the corresponding components shown in FIGS. 1 to 6, and the differences will be described below.

As shown in FIGS. 7A and 7B, in the present embodiment, instead of the stopper 22 of the protective member 21 and the coating stripping member 40 according to first embodiment, a stopper 52 (closing member) in which a bottomed female screw hole 52a is formed and a coating stripping member 50 are provided.

The coating stripping member 50 has, in addition to the cutting blade portions 30A and 30B and the joint portion 33, a connection portion 55 with a male screw 55a that connects the cutting blade portions 30A and 30B to the stopper 52 via the joint portion 33 such that positional adjustment in the axial direction is possible. That is to say, as shown in FIG. 8, the stopper 52 and the coating stripping member 50 are configured such that relative positions thereof in the axial direction can be adjusted by screwing the male screw 55a of the coating stripping member 50 into the female screw hole 52a of the stopper 52, and the connection portion 55 is configured so as to function as a positioning portion that positions the cutting edge portions 31a and 32a of the opposing blades 31 and 32 of the cutting blade portions 30A and 30B at predetermined positions with respect to the stopper 52 in the axial direction.

Moreover, the stopper 52 and the coating stripping member 50 are integrally connected to each other in a state in which the cutting edge portions 31a and 32a of the opposing blades 31 and 32 are positioned with respect to the stopper 52, by the resin material 25 being formed by thermally curing the thermosetting epoxy resin solution L and the heat-shrinkable tube 23 being fixed to the stopper 52 and the resin material 25 while thermally shrinking.

As described above, in the present embodiment, after the position of the coating stripping member 50 with respect to the stopper 52 in the axial direction is adjusted, the coating stripping member 50 is fixed in the adjusted position by the water blocking agent, and thus the coating stripping member 50 and the stopper 52 are integrally connected to each other. Accordingly, irrespective of the form of the intermediate portion W1a of the insulation-coated wire W1, the length of the heat-shrinkable tube 23 of the protective member 21, and the like, the cutting blade portions 30A and 30B of the coating stripping member 50 can be arranged at positions that are suitable for cutting into the coating 12, and thus a more stable, favorable water blocking structure can be realized.

Third Embodiment

Figure 9:
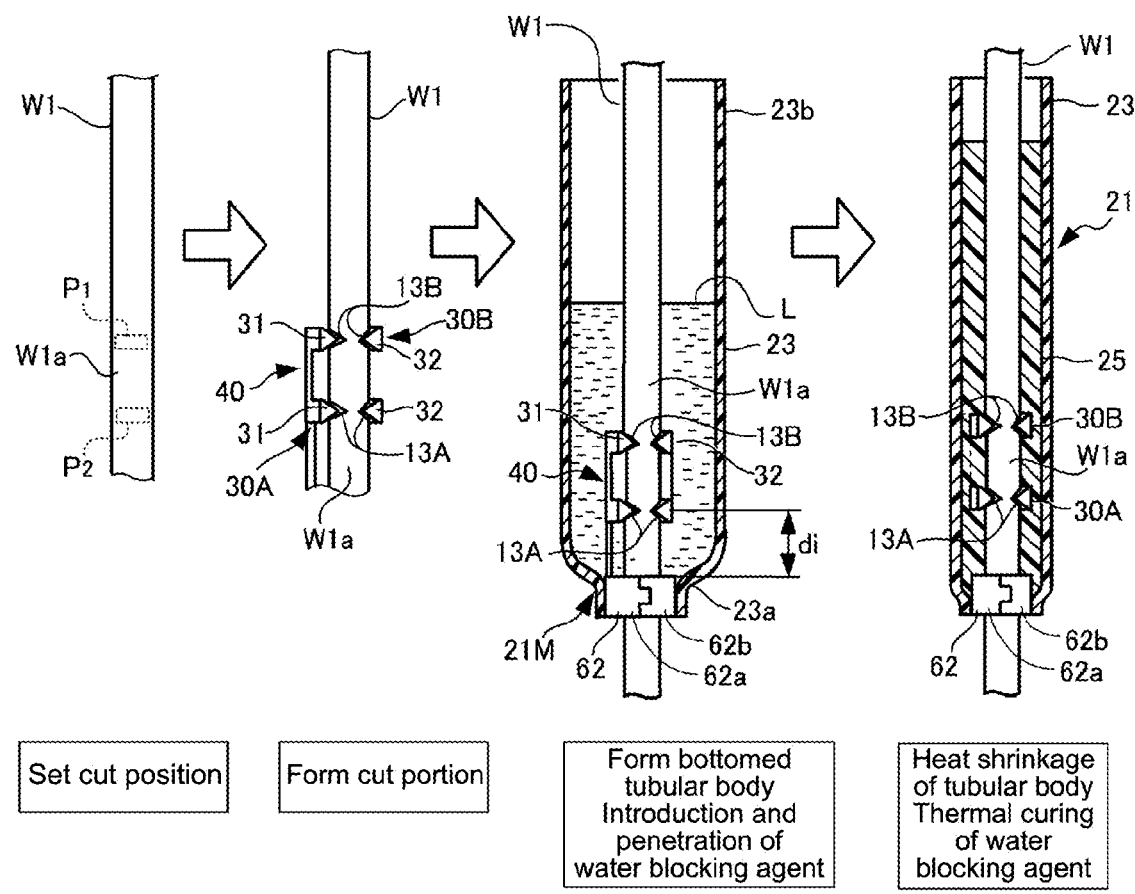
FIG. 9 is an explanatory diagram of a manufacturing process of a wire harness including a water blocking structure for an insulation-coated wire according to a third embodiment of the present invention.

FIG. 9 shows a manufacturing process of a wire harness including a water blocking structure for an insulation-coated wire according to a third embodiment of the present invention.

Although the intermediate portion W1a of the insulation-coated wire W1 is folded back in a substantially U shape in the foregoing embodiments, the present invention is also applicable to a case where water blocking is performed in the intermediate portion W1a of the insulation-coated wire W1 that is not folded back and has a substantially straight shape.

The water blocking structure for an insulation-coated wire according to the third embodiment performs water blocking of the intermediate portion W1a of the insulation-coated wire W1 that has such a substantially straight shape, and the protective member 21 has an annular stopper 62 (closing member) that is substituted for the stopper 22 for completely closing the protective member 21 according to the first embodiment. This stopper 62 is composed of two parts that engage with each other by protrusion-recess engagement.

Specifically, as shown in a bottomed tubular body forming step in FIG. 9, the stopper 62 is composed of an annular body into which a pair of substantially semi-cylindrical stopper members 62a and 62b are integrated by protrusion-recess engagement. Moreover, a plurality of annular ribs, which are not shown, are provided on the inner circumferential surface side of this stopper 62, the annular ribs being spaced apart from one another in the axial direction, and the inner diameter of the stopper 62 is slightly smaller than the outer diameter of the coating 12. That is to say, the stopper 62 is in close contact with the outer circumference of the coating 12 with a predetermined interference.

In the present embodiment, as shown in a cut position setting step in FIG. 9, first, a plurality of cut positions P1 and P2 are set in the substantially straight-shaped intermediate portion W1a of the insulation-coated wire W1, and then, as shown in a cut portion forming step in FIG. 9, the coating stripping member 40 is engaged with the intermediate portion W1a of the insulation-coated wire W1 from one side, and the coating stripping member 40 is caused to function. It should be noted that the coating stripping member 40 may be reduced to a depth of a recess (corresponding to the recess 34) that is approximately equal to the diameter of a single insulation-coated wire W1, or a guide or a restricting portion that bends the coating 12 of the insulation-coated wire W1 in a meandering manner may be provided in the coating stripping member 40.

Also in the present embodiment, the slit portions 13A and 13B that expose a portion of the conductor 11 inside the coating 12 to the outside of the coating 12 can be formed on opposite sides of the intermediate portion W1a with respect to the radial direction without stripping the coating 12 from the conductor 11, by the coating stripping member 40 cutting open the coating 12 of the insulation-coated wire W1 with the opposing blades 31 and 32.

Then, as shown in a bottomed tubular body forming step in FIG. 9, the intermediate portion W1a of the insulation-coated wire W1 in which the slit portions 13A and 13B are formed is surrounded by the pair of substantially semi-cylindrical stopper members 62a and 62b, and the two stopper members 62a and 62b are integrated into the annular stopper 62 by protrusion-recess engagement. It should be noted that it is also possible to attach this annular stopper 62 to the intermediate portion W1a of the insulation-coated wire W1 prior to the coating stripping member 40 and perform positioning of the coating stripping member 40 in the axial direction with reference to the stopper 62 during attachment of the coating stripping member 40.

Then, the bottomed tubular body 21M for the protective member 21 is produced by heating the end portion 23a of the heat-shrinkable tube 23 with hot air or the like and thereby bringing the end portion 23a into close contact with the outer circumference of the stopper 62. Also, the intermediate portion W1a of the insulation-coated wire W1 and the coating stripping member 40 are inserted into the bottomed tubular body 21M from the side of the larger-diameter end portion 23b of the heat-shrinkable tube 23 before heat shrinkage, and the end portion 23a of the heat-shrinkable tube 23 surrounds the circumference of the stopper 62 constituting a portion of the coating stripping member 40. At this time, the end portion 23a of the heat-shrinkable tube 23 is closed by the stopper 62 and the intermediate portion W1a of the insulation-coated wire W1.

Then, as shown in a water blocking agent introduction and penetration step in FIG. 9, the two-component thermosetting epoxy resin solution L is introduced into the bottomed tubular body 21M from the side of the other end portion 23b of the heat-shrinkable tube 23, and the intermediate portion W1a of the insulation-coated wire W1, especially within a certain distance from the slit portions 13A and 13B, is immersed in the thermosetting epoxy resin solution L.

Then, as shown in a tubular body heat shrinkage and water blocking agent thermal curing step in FIG. 9, the bottomed tubular body 21M in a state in which the insulation-coated wire W1 is inserted to a predetermined insertion depth position and the slit portions 13A and 13B are immersed in the water blocking agent is entirely heated from the outside to shrink the heat-shrinkable tube 23 of the bottomed tubular body 21M and thermally cure the thermosetting epoxy resin solution L in the heat-shrinkable tube 23.

Also in the present embodiment, each of the cutting blade portions 30A and 30B of the coating stripping member 40 has the opposing blades 31 and 32 on the entrance side of the recess 34 and the wire holding portion 35 on the inner side, and substantially the same effects as those of the above-described first embodiment are obtained.

Fourth Embodiment

Figure 10:
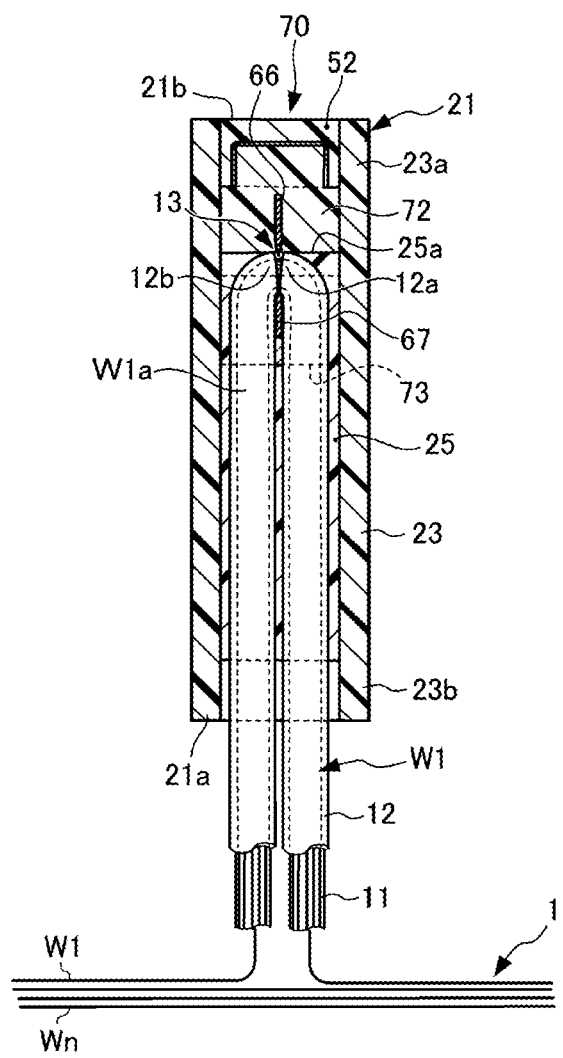
FIG. 10 is a cross-sectional view of a relevant portion of a wire harness including a water blocking structure for an insulation-coated wire according to a fourth embodiment of the present invention.
Figure 11A:
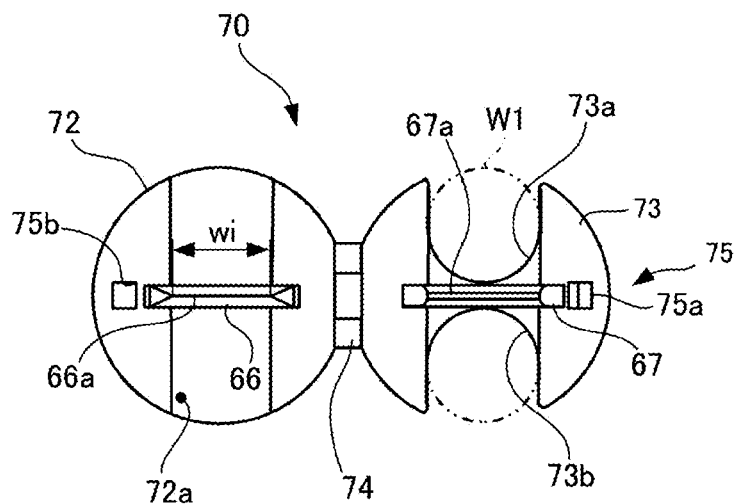
FIGS. 11A and 11B show a coating stripping member of the water blocking structure for an insulation-coated wire according to the fourth embodiment of the present invention in a state in which the coating stripping member is opened.
Figure 11B:
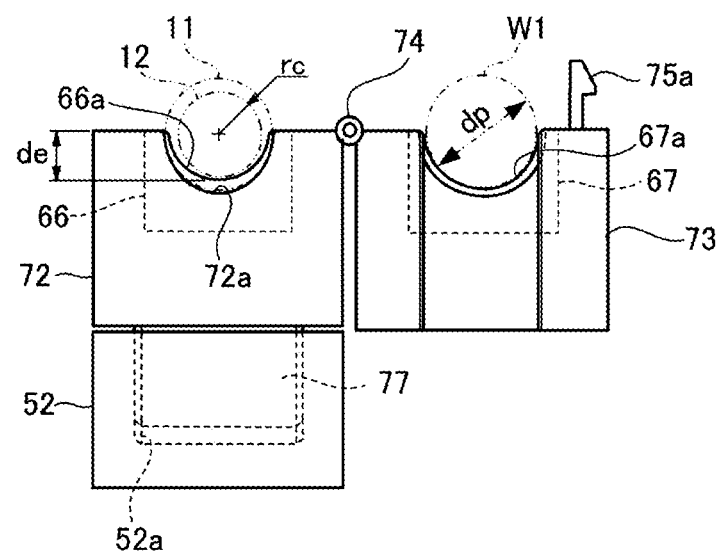

FIGS. 10, 11A, and 11B show a water blocking structure for an insulation-coated wire according to a fourth embodiment of the present invention, and FIGS. 11A and 11B show a coating stripping member of the water blocking structure in an opened state.

In the water blocking structure for an insulation-coated wire according to the present embodiment, a coating stripping member 70 is contained inside the protective member 21 so as to be located in close proximity to the stopper 52. This coating stripping member 70 is adapted to form the slit portion 13 within a region where the coating tube 12 of the insulation-coated wire W1 is folded back and be able to provide the function of exposing a portion of the conductor 11 inside the coating tube 12 to the outside of the coating tube 12 without stripping the coating tube 12 from the conductor 11, that is, the function equivalent to stripping the coating.

Specifically, the coating stripping member 70 has a first holding member 72 and a second holding member 73 that are rotatably hinged to each other and also locked to each other so that the rotation is restricted.

As shown in FIGS. 10, 11A, and 11B, the first holding member 72 of the coating stripping member 70 has a cutting blade portion 66 that is capable of cutting open the intermediate portion W1a (folded-back portion of the coating 12) of the insulation-coated wire W1 that is bent in a substantially U shape from the outside of the bend. Moreover, the second holding member 73 is rotatably hinged to the first holding member 72 by a known hinge 74, and can be locked by a lock mechanism 75 so that the relative rotation is restricted. Furthermore, a retaining blade portion 67 that engages with the coating 12 so as to hold the intermediate portion W1a of the insulation-coated wire W1 together with the first holding member 72 and the stopper 52 is attached to the second holding member 73.

As shown in FIGS. 11A and 11B, the cutting blade portion 66 has a substantially semi-circular cutting edge line 66a having an entrance width wi that is close to the diameter dp of the coating tube 12 of the insulation-coated wire W1 and a depth de that is close to the radius rc of the conductor 11 (e.g., rc≤de<dp/2), and the cutting edge angle (this means the angle formed by the two blade surfaces) is an acute angle. This cutting blade portion 66 may also have a pair of cutting edge lines extending substantially parallel to each other in a direction of a tangent to a cross section of the conductor 11, a V-shaped cutting edge line, or the like instead of the substantially arc-shaped cutting edge line 66a.

A receiving groove 72a having a substantially arc-shaped cross section with a radius that is close to the radius of the coating tube 12 of the insulation-coated wire W1 is formed in an inner end portion of the first holding member 72 opposing the second holding member 73, the receiving groove 72a extending in a radial direction of the stopper 52. Then, the cutting blade portion 66 protrudes to the inside of the receiving groove 72a so as to have a first protruding height on the inner side of the receiving groove 72a, the first protruding height being approximately equal to the thickness of the coating tube 12, and a second protruding height on the entrance side of the receiving groove 72a, the second protruding height being smaller than the first protruding height. It should be noted that although the receiving groove 72a reaches the outer circumferential surface of the stopper 52 here, it is also possible that the receiving groove 72a has a reduced width in the vicinity of the outer circumferential surface of the stopper 52 such that the receiving groove 72a is blocked at both ends thereof.

The cutting blade portion 66 is made of a material having a sufficiently greater thermal conductivity than both the resin material 25 and the coating tube 12, for example, a metal whose thermal conductivity is ten or more times greater than those of both the resin material 25 and the coating tube 12.

The retaining blade portion 67 has a substantially semi-circular cutting edge line or retaining surface 67a having an entrance width wi that is close to the diameter dp of the coating tube 12 of the insulation-coated wire W1 and a depth de that is substantially equal to the radius of the coating tube 12, and the cutting edge angle is an obtuse angle, or the cutting edge is flattened to an arc-shaped or polygonal cross section. The retaining surface 67a of this retaining blade portion 67 may also have a polygonal shape instead of a substantially arc shape.

The retaining blade portion 67 is fixed to the second holding member 73, and the second holding member 73 has guide grooves 73a and 73b in the vicinity of the retaining blade portion 67, the guide grooves guiding the intermediate portion W1a of the insulation-coated wire W1 such that the intermediate portion W1a is bent in the folded-backward direction in a substantially U shape. Both of the guide grooves 73a and 73b have a substantially arc-shaped cross section having a radius that is close to the radius (dp/2) of the coating tube 12 of the insulation-coated wire W1, and are configured such that when the intermediate portion W1a of the insulation-coated wire W1 is guided in the folded-backward direction into the bent shape, the retaining blade portion 67 is brought into pressure engagement with the coating tube 12 on the inside of the bend of the intermediate portion W1a of the insulation-coated wire W1.

Moreover, the second holding member 73 is joined to the stopper 52 via the known hinge 74 and the lock mechanism 75 as well as the first holding member 72. In a state in which the lock mechanism 75 is released, the second holding member 73 can be rotated relative to the stopper 52 and the first holding member 72 between a fully opened position shown in FIGS. 2A and 2B and a lock position shown in FIG. 3. The lock mechanism 75 may be of, for example, a snap-lock type having a hook-shaped locking claw 75a on the side of the second holding member 73 and a locking portion 75b on the side of the stopper 52. However, any lock mechanism that is capable of locking the second holding member 73 in the lock position shown in FIG. 3 with respect to the first holding member 72 can be adopted.

The first holding member 72 and the second holding member 73 are formed of a material such as, for example, hard resin or metal that is the same as or has substantially the same coefficient of linear expansion as the material for the stopper 52. In the case where the second holding member 73 is formed of a hard resin, a polyolefin resin such as, for example, polypropylene (PP) or polyethylene (PE) can be used as in the case of the stopper 52, and it can be expected that the heat-shrinkable tube 23 develops a heat sealing property when shrinking and coming into close contact with the outer circumference of the second holding member 73 in a liquid-tight manner.

As shown in FIG. 11B, the coating stripping member 70 has a connection portion 77 with a male screw that connects the first holding member 72 to the stopper 52 such that positional adjustment in the axial direction is possible. That is to say, the relative positions of the stopper 52 and the coating stripping member 70 in the axial direction can be adjusted by screwing the connection portion 77 with the male screw of the coating stripping member 70 into the female screw hole 52a of the stopper 52. The connection portion 77 and the stopper 51 are adapted to function as a positioning portion that positions the cutting edge portions 66a and 67a of the cutting blade portion 66 and the retaining blade portion 67 in predetermined positions with respect to the stopper 52 in the axial direction.

Moreover, the stopper 52 and the coating stripping member 70 are integrally connected to each other in a state in which the cutting edge portions 66a and 67a of the cutting blade portion 66 and the retaining blade portion 67 are positioned with respect to the stopper 52, by the resin material 25 being formed by thermally curing the thermosetting epoxy resin solution L and the heat-shrinkable tube 23 being fixed to the stopper 52 and the resin material 25 while thermally shrinking.

As described above, in the present embodiment, after the position of the coating stripping member 70 with respect to the stopper 52 in the axial direction is adjusted, the coating stripping member 70 is fixed in the adjusted position by the water blocking agent, and the coating stripping member 70 and the stopper 52 are integrally connected to each other. Accordingly, irrespective of the form of the intermediate portion W1a of the insulation-coated wire W1, the length of the heat-shrinkable tube 23 of the protective member 21, and the like, the cutting blade portion 66 and the retaining blade portion 67 of the coating stripping member 70 can be arranged at positions that are suitable for cutting into the coating 12, and thus a more stable, favorable water blocking structure can be realized.

Fifth Embodiment

Figure 12:
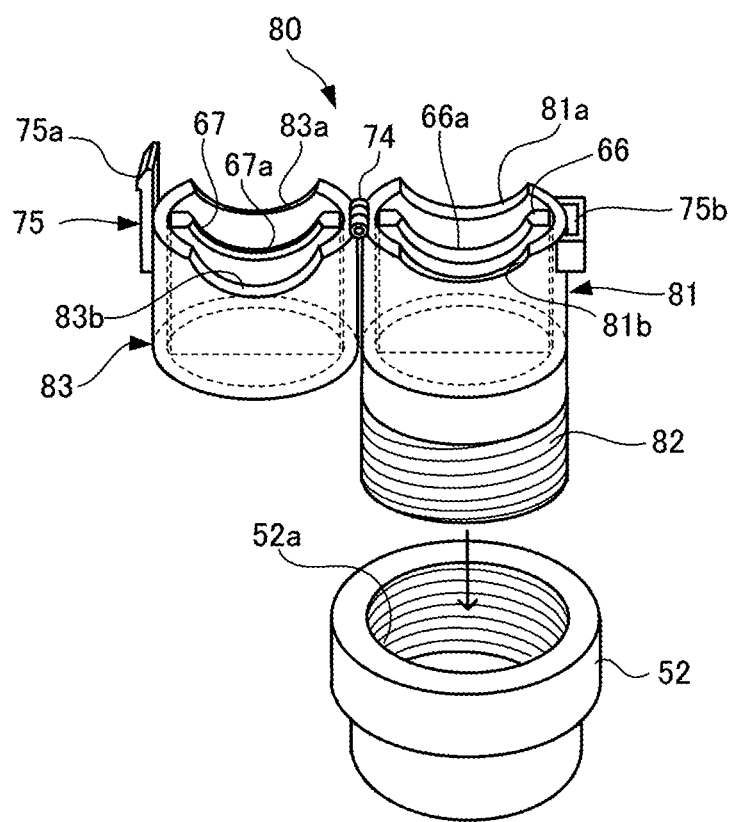
FIG. 12 is a perspective view of a relevant portion showing a coating stripping member of a water blocking structure for an insulation-coated wire according to a fifth embodiment of the present invention in a state in which the coating stripping member is opened.

FIG. 12 shows a coating stripping member of a water blocking structure for an insulation-coated wire according to a fifth embodiment of the present invention in a state in which the coating stripping member is opened before being screwed to a stopper.

In the present embodiment, a coating stripping member 80 is provided inside the protective member 21. It should be noted that the coating stripping member 80 is adapted to be locked in a closed state as in the case of the coating stripping member 70 of the fourth embodiment.

Specifically, the coating stripping member 80 includes a first tubular holding portion 81 that holds the sharp cutting blade portion 66 that is capable of cutting open the coating 12 of the insulation-coated wire W1, the stopper 52 that closes the end portion 23a of the heat-shrinkable tube 23, and a second tubular holding portion 83 with the retaining blade portion 67 that holds the intermediate portion W1a of the insulation-coated wire W1 together with the first tubular holding portion 81. Also, the coating stripping member 80 has a hinge 74 and a lock mechanism 75 that join the first tubular holding portion 81 and the second tubular holding portion 83 to each other, and a connection portion 82 with a male screw that is provided on one end side of the first tubular holding portion 81 so as to be screwed to the stopper 52.

The first tubular holding portion 81 is a substantially cylindrical body that is made of resin or metal and to which the cutting blade portion 66 is integrally fixed, and is screwed and fixed to the stopper 52 via the connection portion 82. Moreover, on the other end side of the first tubular holding portion 81 in the axial direction, a pair of substantially semi-circular recesses 81a and 81b that are recessed in the same direction as the cutting edge line 66a of the cutting blade portion 66 are formed so as to guide and hold the intermediate portion W1a of the insulation-coated wire W1.

The second tubular holding portion 83 is a substantially cylindrical body that is made of resin or metal and to which the retaining blade portion 67 is integrally fixed, and is joined to the first tubular holding portion 81 via the hinge 74 on one end side in the axial direction. Moreover, on that end side of this second tubular holding portion 83 in the axial direction, a pair of substantially semi-circular recesses 83a and 83b that are recessed in the same direction as the cutting edge line or retaining surface 67a of the retaining blade portion 67 are formed so as to guide and hold the intermediate portion W1a of the insulation-coated wire W1.

In the present embodiment, unlike the fourth embodiment, no guide groove extending in the axial direction so as to guide the intermediate portion W1a of the insulation-coated wire W1 that is bent in the folded-backward direction is formed in the second tubular holding portion 83, but the position of the leading end of the intermediate portion W1a of the insulation-coated wire W1 is determined by the retaining blade portion 67. Then, the cutting blade portion 66 that is held so as to oppose the retaining blade portion 67 via the first tubular holding portion 81 and the second tubular holding portion 83 cuts into the coating 12 within the bent region, and thus the slit portion 13 is formed within the folded-back bent region of the coating 12.

Also in the present embodiment, the cutting blade portion 66 and the retaining blade portion 67 of the coating stripping member 80 can be arranged at positions that are suitable for cutting into the coating 12, a low-cost water blocking structure for an insulation-coated wire that can ensure high water blocking ability and favorable workability at an intermediate portion can be provided, and a low-cost wire harness that employs this water blocking structure and thus has high water blocking ability and favorable workability can be provided.

Furthermore, according to the present embodiment, since both of the first tubular holding portion 81 and the second tubular holding portion 83 of the coating stripping member 80 have a tubular shape, the thermosetting epoxy resin solution L is easily introduced around the slit portion 13 without resistance, and thus the water blocking ability can be increased even more.

It should be noted that although the two cutting blade portions 30A and 30B each having the opposing blades 31 and 32 are arranged inside the heat-shrinkable tube 23 of the protective member 21 are adopted in the foregoing embodiments, a single cutting blade portion having the opposing blades 31 and 32 may also be provided, or three or more cutting blade portions may also be provided. That is to say, instead of making slits at two positions of the intermediate portion W1a of the insulation-coated wire W1 in the axial direction, it is also possible to form a slit portion at one position or slit portions at three or more positions in the axial direction.

Furthermore, although the shape of the opposing blades 31 and 32 of the coating stripping member 40 is illustrated as a shape like a rectangle and having angular portions at the four corners in the foregoing embodiments, it goes without saying that the angular portions can be chamfered or formed as curved surfaces. Moreover, it is sufficient if the opposing blades 31 and 32 can form the slit portions 13A and 13B in the coating 12 of one of the two paths of the insulation-coated wire W1 in the intermediate portion W1a of the insulation-coated wire W1 from opposite sides with respect to the radial direction, and the size of the opposing blades 31 and 32 may be reduced, or the cutting edges of the opposing blades 31 and 32 on the entrance side of the recesses 34 may be flattened. Naturally, the outer circumferential surface of the opposing blades 31 and 32 may also be, for example, a substantially cylindrical surface that opens at the entrance of the recess 34.

Moreover, although the opposing blades 31 and 32 of the coating stripping member 40 are metal blades in the first embodiment, the cutting blade portions may be formed of a hard resin instead of being metal blades, and the cutting edges thereof may also be saw-shaped.

As described above, the present invention can provide a low-cost water blocking structure for an insulation-coated wire that can ensure high water blocking ability and favorable workability at an intermediate portion of the insulation-coated wire as well as a wire harness including the water blocking structure, and is useful for a water blocking structure for an insulation-coated wire that is effective when provided at an intermediate portion of the insulation-coated wire as well as wire harnesses in general.

What is claimed is:

1. A water blocking structure for an insulation-coated wire, the water blocking structure comprising:
    a heat-shrinkable tubular member that is closed at one end by a closing member and that accommodates an intermediate portion of an insulation-coated wire, and a water blocking agent that is accommodated in the tubular member and that penetrates the intermediate portion of the insulation-coated wire,
    wherein a slit portion is formed in a coating of the insulation-coated wire, and the water blocking agent penetrates the intermediate portion via the slit portion, and
    a coating stripping member having a blade portion with a cutting edge directed to the inside of the slit portion is contained within the tubular member, and the closing member and the coating stripping member are integrally connected to each other, wherein
    the blade portion of the coating stripping member is positioned outside of the closing member.

2. The water blocking structure for an insulation-coated wire according to claim 1,
    wherein the slit portion is formed in the coating of the insulation-coated wire so as to extend in a direction that crosses an axis of the insulation-coated wire, and
    the blade portion has first and second cutting edge portions that are arranged on opposite sides of the intermediate portion with respect to a radial direction so that respective cutting edges of the first and second cutting edge portions oppose each other.

3. The water blocking structure for an insulation-coated wire according to claim 2,
    wherein the coating stripping member includes the blade portion having the first and second cutting edge portions, a joint portion that integrally joins the first and second cutting edge portions of the blade portion to each other, and a positioning portion that joins the joint portion to the closing member and positions the first and second cutting edge portions with respect to the closing member.

4. A wire harness comprising the water blocking structure for an insulation-coated wire according to claim 3.

5. A wire harness comprising the water blocking structure for an insulation-coated wire according to claim 2.

6. The water blocking structure for an insulation-coated wire according to claim 1,
    wherein the closing member and the coating stripping member are connected to each other such that relative positions thereof can be adjusted in an axial direction of the insulation-coated wire, and the relative positions are fixed by the water blocking agent.

7. A wire harness comprising the water blocking structure for an insulation-coated wire according to claim 6.

8. A wire harness comprising the water blocking structure for an insulation-coated wire according to claim 1.

* * * * *